United States Patent
Smith et al.

(10) Patent No.: US 12,435,934 B2
(45) Date of Patent: Oct. 7, 2025

(54) MULTI-STAGE CHILLER

(71) Applicant: GM GLOBAL TECHNOLOGY OPERATIONS LLC, Detroit, MI (US)

(72) Inventors: Cameron Paul Smith, Milford, MI (US); Tapan Gaurav Dangarwala, Royal Oak, MI (US); Kyle Holihan, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 238 days.

(21) Appl. No.: 18/128,578

(22) Filed: Mar. 30, 2023

(65) Prior Publication Data

US 2024/0328732 A1 Oct. 3, 2024

(51) Int. Cl.
| F28F 27/02 | (2006.01) |
| F25B 39/02 | (2006.01) |
| F25B 41/31 | (2021.01) |
| F25B 49/02 | (2006.01) |

(52) U.S. Cl.
CPC ............ F28F 27/02 (2013.01); F25B 39/02 (2013.01); F25B 41/31 (2021.01); F25B 49/02 (2013.01)

(58) Field of Classification Search
CPC ........... F28F 27/02; F25B 41/31; F25B 41/34; F25B 41/35; F25B 41/325; F25B 39/022; F25B 39/028; F25B 39/024; F25B 2700/2117; F25B 2700/21171; F25B 2700/2103; F25B 2600/2513; F25B 2339/047; B60H 1/00392; B60H 1/143
See application file for complete search history.

(56) References Cited

U.S. PATENT DOCUMENTS

| 8,966,936 | B2 * | 3/2015 | Ahn ....................... F25B 41/325 |
| | | | 137/869 |
| 11,065,936 | B2 * | 7/2021 | Gonze ................. B60H 1/00385 |
| 2019/0299791 | A1 * | 10/2019 | Gonze .................... H01M 10/66 |
| 2024/0288204 | A1 * | 8/2024 | Madsen ..................... F25B 7/00 |

FOREIGN PATENT DOCUMENTS

| JP | 2004182009 A | * | 7/2004 | ............ F25B 41/062 |
| KR | 20220090642 A | * | 6/2022 | .............. F25B 41/35 |
| WO | WO-2012144137 A1 | * | 10/2012 | ......... B60H 1/00485 |

OTHER PUBLICATIONS

KR-20220090642-A English Translation (Year: 2020).*
WO-2012144137-A1 English Translation (Year: 2012).*
JP-2004182009-A English Translation (Year: 2004).*

* cited by examiner

Primary Examiner — Frantz F Jules
Assistant Examiner — Devon Moore (57) ABSTRACT

A thermal management system including a heat exchanger and an expansion valve. The expansion valve is in fluid communication with the heat exchanger to control flow of a first heat exchange medium to the heat exchanger. The expansion valve includes a valve inlet, a first valve outlet in fluid communication with a first inlet and first passageways of the heat exchanger, and a second valve outlet in fluid communication with a second inlet and second passageways of the heat exchanger. An actuator of the expansion valve is movable from a closed position to a first open position and a second open position.

20 Claims, 4 Drawing Sheets

MULTI-STAGE CHILLER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a thermal management system including a multi-stage heat exchanger and expansion valve.

An electric vehicle thermal management system includes a chiller, which draws heat from a coolant loop to a refrigerant loop to cool a battery of the electric vehicle. The chiller is subject to wide variations in load. For example, the chiller is subject to relatively high load during high-power charging and aggressive driving. The chiller is subject to relatively low load at low speeds and moderate ambient temperatures.

SUMMARY

The present disclosure includes, in various features, a thermal management system having a heat exchanger and an expansion valve. The expansion valve is in fluid communication with the heat exchanger to control flow of a first heat exchange medium to the heat exchanger. The expansion valve includes a valve inlet, a first valve outlet in fluid communication with a first inlet and first passageways of the heat exchanger, and a second valve outlet in fluid communication with a second inlet and second passageways of the heat exchanger. An actuator of the expansion valve is movable from a closed position to a first open position and a second open position. In the closed position, the actuator restricts flow of the first heat exchange medium through the first valve outlet and the second valve outlet. In the first open position, the actuator permits flow of the first heat exchange medium through the first valve outlet to the first passageways and restricts flow of the first heat exchange medium through the second valve outlet to the second passageways. In the second open position, the actuator permits flow of the first heat exchange medium through the first valve outlet to the first passageways and permits flow of the first heat exchange medium through the second valve outlet to the second passageways.

In further features, the heat exchanger is a chiller.

In further features, the first heat exchange medium is a refrigerant.

In further features, the heat exchanger further includes third passageways adjacent to the first passageways and the second passageways, the third passageways configured to conduct a second heat exchange medium therethrough.

In further features, the second heat exchange medium is a coolant.

In further features, the chiller is in fluid communication with a refrigerant loop and a coolant loop including a vehicle battery.

In further features, a control module is configured to control movement of the actuator. The control module is configured to move the actuator from the closed position to the first open position when temperature of the coolant in the coolant loop reaches a first level. The control module is configured to move the actuator from the first open position to the second open position when temperature of the coolant in the coolant loop reaches a second level that is greater than the first level.

In further features, the expansion valve is an electronic expansion valve, and the actuator is movable by a motor to each of the closed position, the first open position, and the second open position.

In further features, the actuator is a needle actuator.

In further features, the actuator is a rotary actuator.

In further features, the heat exchanger is an evaporator.

The present disclosure includes, in various features, a thermal management system having a chiller and an expansion valve. The chiller includes a first inlet in fluid communication with first refrigerant passageways configured to conduct refrigerant therethrough. A second inlet is in fluid communication with second refrigerant passageways configured to conduct the refrigerant therethrough. A first outlet is in fluid communication with the first refrigerant passageways and the second refrigerant passageways. Coolant passageways are adjacent to the first refrigerant passageways and the second refrigerant passageways. The coolant passageways are configured to conduct coolant therethrough. The expansion valve is in fluid communication with the chiller to control flow of the refrigerant to the chiller. The expansion valve includes a valve inlet, a first valve outlet in fluid communication with the first inlet of the chiller and the first refrigerant passageways, a second valve outlet in fluid communication with the second inlet of the chiller and the second refrigerant passageways, and an actuator movable from a closed position to a first open position and a second open position. In the closed position, the actuator restricts flow of the refrigerant through the first valve outlet and the second valve outlet. In the first open position, the actuator permits flow of the refrigerant through the first valve outlet to the first refrigerant passageways and restricts flow of the refrigerant through the second valve outlet to the second refrigerant passageways. In the second open position, the actuator permits flow of the refrigerant through the first valve outlet to the first refrigerant passageways and permits flow of the refrigerant through the second valve outlet to the second refrigerant passageways.

In further features, the chiller is in fluid communication with a refrigerant loop and a coolant loop including a vehicle battery.

In further features, a control module is configured to control movement of the actuator. The control module is configured to move the actuator from the closed position to the first open position when temperature of coolant in the coolant loop reaches a first level. The control module is configured to move the actuator from the first open position to the second open position when temperature of the coolant in the coolant loop reaches a second level that is greater than the first level.

In further features, the expansion valve is an electronic expansion valve, and the actuator is movable by a motor of the electronic expansion valve to each of the closed position, the first open position, and the second open position.

In further features, the actuator is a needle actuator.

In further features, the actuator is a rotary actuator.

The present disclosure further includes, in various features, thermal management system with a coolant loop, a refrigerant loop, and a control module. The coolant loop includes a coolant pump, a vehicle battery configured to power a vehicle motor, and a chiller including a first chiller inlet in fluid communication with first refrigerant passageways defined in the chiller and a second chiller inlet in fluid communication with second refrigerant passageways defined in the chiller. A refrigerant loop includes the chiller, a compressor, and an expansion valve configured to control flow of refrigerant to the chiller. The expansion valve includes a valve inlet, a first valve outlet in fluid communication with the first chiller inlet, and a second valve outlet in fluid communication the second chiller inlet. An actuator is configured to control refrigerant flow through the first valve outlet and the second valve outlet. A motor configured to move the actuator. A control module configured to control movement of the actuator of the expansion valve. The control module is configured to control the motor of the expansion valve to move the actuator from a closed position to a first open position when temperature of the coolant in the coolant loop reaches a first level. In the first open position, the actuator permits refrigerant flow through the first valve outlet to the first refrigerant passageways of the chiller and restricts refrigerant flow through the second valve outlet to the second refrigerant passageways. The control module is configured to move the actuator from the first open position to a second open position when temperature of the coolant in the coolant loop reaches a second level that is greater than the first level. In the second open position the actuator permits refrigerant flow through the first valve outlet to the first refrigerant passageways of the chiller and permits refrigerant flow through the second valve outlet to the second refrigerant passageways.

In further features, the chiller defines coolant passageways between each of the first refrigerant passageways and the second refrigerant passageways. The coolant passageways are in fluid communication with the coolant loop.

In further features, the refrigerant loop further includes a cabin condenser and an evaporator.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
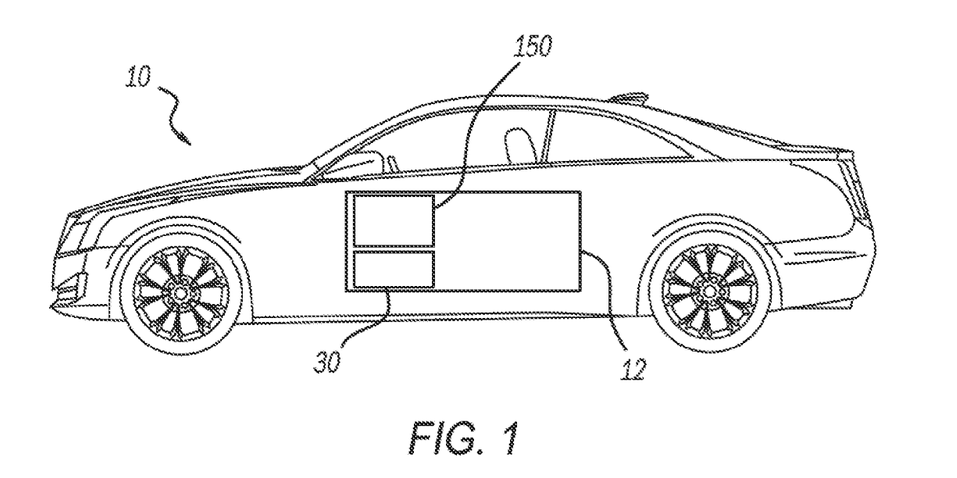
FIG. 1 is a side view of an exemplary vehicle including a thermal management system in accordance with the present disclosure.

FIG. 1 illustrates an exemplary vehicle 10 including a thermal management system 12 in accordance with the present disclosure. The thermal management system 12 may be configured to manage thermal energy for any suitable vehicle, such as any suitable battery electric vehicle (BEV) or hybrid vehicle, for example. Suitable vehicles include, but are not limited to, passenger vehicles, utility vehicles, mass transit vehicles, military vehicles, construction vehicles, watercraft, aircraft, etc. The thermal management system 12 may also be configured for use in any suitable non-vehicular applications. For example, the thermal management system 12 may be configured to manage thermal energy of any suitable building, construction equipment, military equipment, etc.

Figure 2:
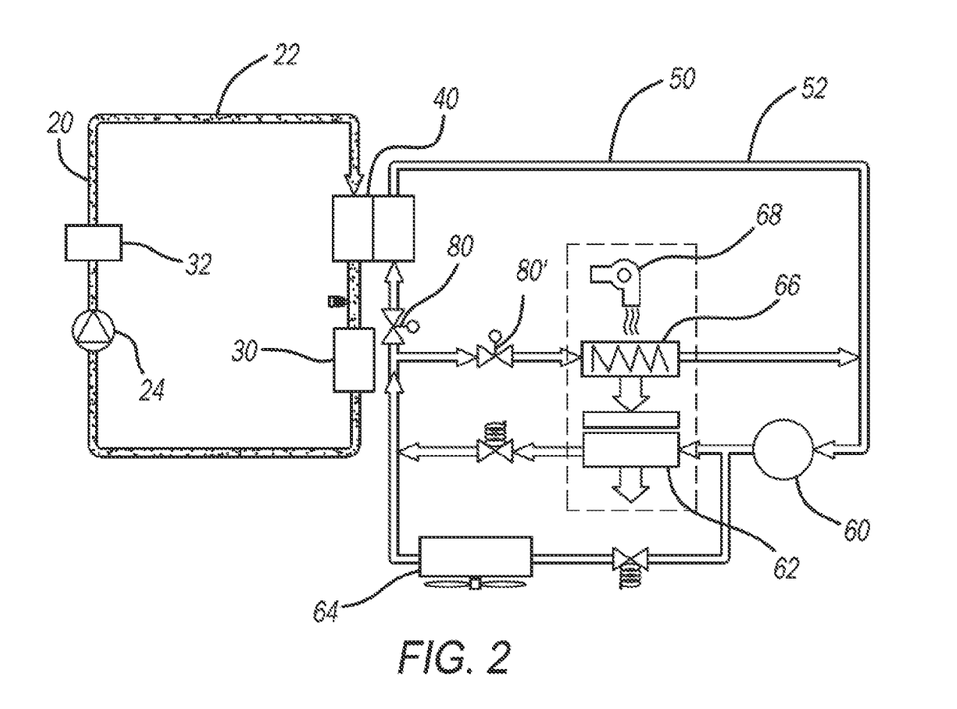
FIG. 2 is a diagram of an exemplary configuration of the thermal management system including a heat exchanger and an expansion valve in accordance with the present disclosure.

FIG. 2 illustrates an exemplary configuration of the thermal management system 12 in accordance with the present disclosure. The thermal management system 12 generally includes a coolant loop 20 and a refrigerant loop 50. The coolant loop 20 includes coolant conduits 22, through which any suitable coolant is circulated. The coolant is pumped throughout the coolant loop 20 by any suitable coolant pump 24 to cool various components of the coolant loop 20. For example, the coolant conduits 22 direct coolant to and from a battery 30 of the vehicle 10 to cool the battery 30, which typically increases in temperature during high-powered charging and aggressive driving, for example.

The coolant loop 20 may include any other suitable components in need of cooling. For example, the coolant loop 20 may include an integrated power electronics (IPE) module 32. The IPE module 32 includes a variety of electronic accessories usable by an operator of the vehicle, equipment, etc. In some applications, the IPE module 32 includes one or more of an AC/DC converter, a high voltage supply, a navigation system, a high voltage charger, a heated seat system, etc., for example. The electronics of the IPE module 32 generate thermal energy, which is carried by the coolant through the coolant loop 20.

Figure 4:
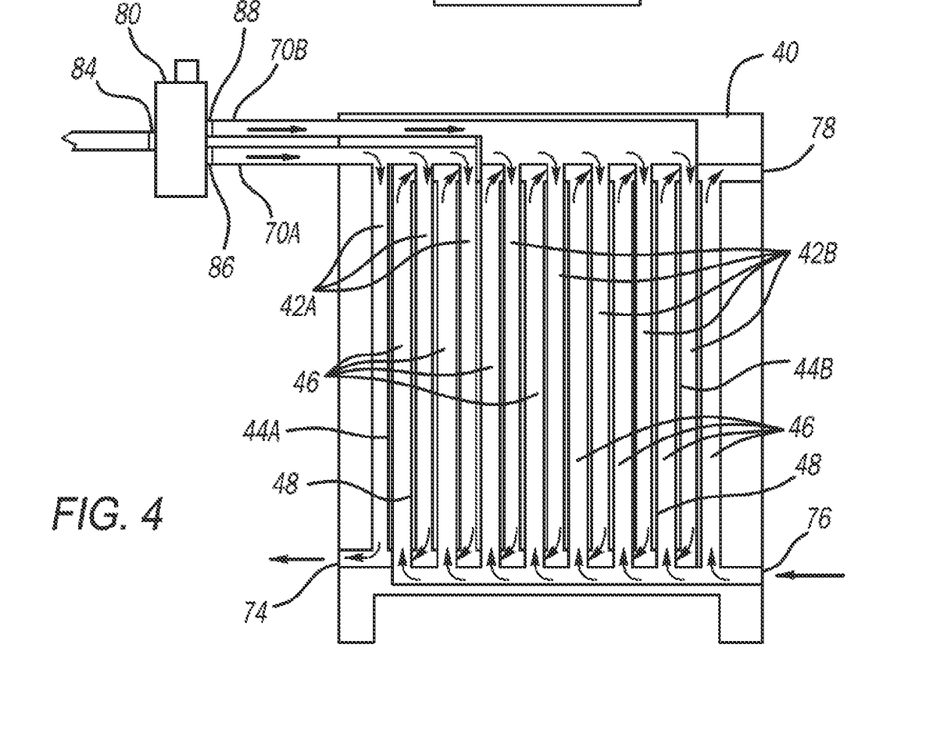
FIG. 4 illustrates an exemplary configuration of the heat exchanger.

The coolant loop 20 further includes a heat exchanger in the form of a chiller 40. Heat generated by the vehicle battery 30, the IPE 32, and any other heat generating device of the coolant loop 20 is carried by the coolant to the chiller 40. The chiller 40 is configured to transfer heat out of the coolant loop 20 to the refrigerant loop 50. As a result, the chiller 40 effectively reduces the temperature of the battery 30, the IPE 32, and other devices of the coolant loop 20. Additional details of the chiller 40 will be described herein, and an exemplary chiller 40 is illustrated in FIG. 4.

The refrigerant loop 50 includes refrigerant conduits 52, through which any suitable refrigerant is circulated. The refrigerant loop 50 includes a compressor 60, which compresses the refrigerant and pumps the refrigerant to a cabin condenser 62. In the example illustrated, the compressor 60 also pumps refrigerant to an exterior condenser 64. From the cabin condenser 62 and the exterior condenser 64, refrigerant flows to an evaporator 66. A blower 68 blows air across the cabin condenser 62 and the evaporator 66 to a passenger cabin of the vehicle. The cabin condenser 62, the evaporator 66, and the blower 68 are included with an HVAC system of the vehicle.

Refrigerant from the cabin condenser 62 and the exterior condenser 64 also flows to the chiller 40. Thus, the chiller 40 is included in both the coolant loop 20 and the refrigerant loop 50. From the chiller 40, the refrigerant flows back through the refrigerant conduits 52 to the compressor 60.

Figure 3:
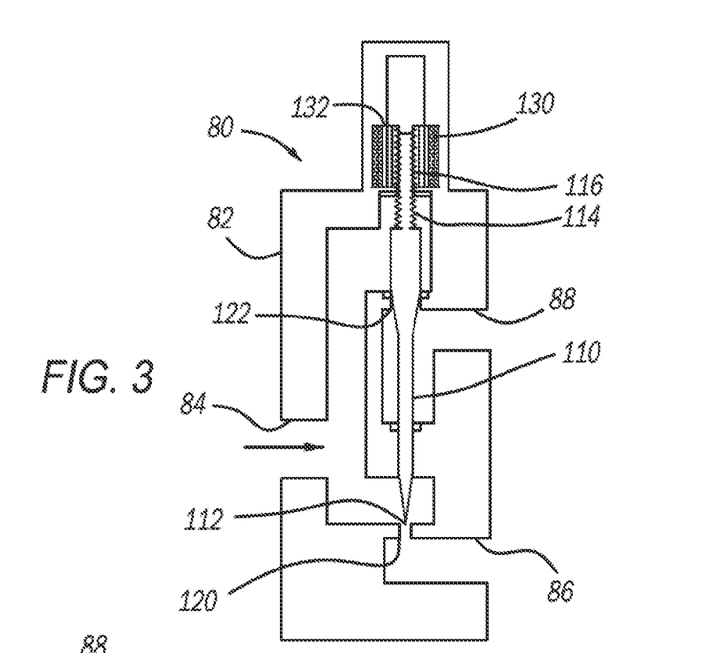
FIG. 3 illustrates an exemplary configuration of the expansion valve.

The refrigerant loop 50 further includes an expansion valve 80. The expansion valve 80 is upstream of the chiller 40, and controls the flow of refrigerant to the chiller 40. With reference to FIG. 3, for example, the expansion valve 80 includes a valve body 82. The valve body 82 defines a valve inlet 84, a first valve outlet 86, and a second valve outlet 88. The valve inlet 84 is connected to the refrigerant conduit 52 to receive refrigerant into the valve body 82. Refrigerant exits the valve body 82 through the first valve outlet 86 and the second valve outlet 88, and flows to the chiller 40 through the refrigerant conduit 52. Although the valve body 82 is illustrated as having two valve outlets 86, 88, the valve body 82 may be configured with any suitable number of outlets greater than two.

Within the valve body 82 is any suitable actuator, which controls the flow of refrigerant through the first valve outlet 86 and the second valve outlet 88. In the example of FIG. 3, the actuator includes a needle 110. The needle 110 includes a tip 112 at a distal end of the needle 110. From the tip 112, the needle 110 increases in thickness gradually along a length of the needle 110. The needle 110 is seated within the valve body 82 within the refrigerant flow path from the valve inlet 84 to each of the first valve outlet 86 and the second valve outlet 88. The needle 110 specifically controls the flow of refrigerant through a first passageway 120 leading to the first valve outlet 86 and a second passageway 122 leading to the second valve outlet 88.

The expansion valve 80 may be an electronic expansion valve including a motor 130 configured to vertically actuate the needle 110. The motor 130 may be any suitable motor, such as a stepper motor. The motor 130 is in cooperation with a magnet 132. The needle 110 includes threads 114, which are in cooperation with threads 116 rotated by the magnet 132. Activation of the motor 130 rotates the magnet 132, which rotates the threads 116. Rotation of the motor 130 in a first direction moves the needle 110 upward, and rotation of the motor 130 in a second direction that is opposite to the first direction moves the needle 110 downward.

The needle 110 is configured to be moved to various positions to control refrigerant flow through the valve body 82. For example, in a fully closed position the needle 110 is fully downward to completely fill and block the first passageway 120 and the second passageway 122, which completely restricts refrigerant flow through the first valve outlet 86 and the second valve outlet 88. From the fully closed position, activation of the motor 130 rotates the needle 110 upward to a first open position. In the first open position, the tapered portion of the needle 110 does not completely fill the first passageway 120, thus allowing a first volume of refrigerant to flow through the first passageway 120 and out through the first valve outlet 86. Because the needle 110 is tapered, an increasing amount of refrigerant will flow through the first passageway 120 as the needle 110 is raised with respect to the orientation of FIG. 3. The needle 110 is sized and shaped such that the needle 110 completely fills the second passageway 122, thus restricting refrigerant flow through the second valve outlet 88, until the needle 110 is raised high enough to allow full flow through the first passageway 120.

As the needle 110 is raised higher due to additional rotation of the magnet 132 by the motor 130, the needle 110 will no longer completely restrict the second passageway 122, and thus refrigerant will be able to flow through the second passageway 122 and out through the second valve outlet 88. When the needle 110 is raised to its maximum height, the first passageway 120 and the second passageway 122 are opened to allow maximum refrigerant flow through the first valve outlet 86 and the second valve outlet 88.

FIG. 4 illustrates the chiller 40 in additional detail. The chiller 40 includes a plurality of first refrigerant plates 42A and a plurality of second refrigerant plates 42B. The first refrigerant plates 42A include first refrigerant passageways 44A configured to conduct refrigerant across the first refrigerant plates 42A. The second refrigerant plates 42B include second refrigerant passageways 44B configured to conduct refrigerant across the second refrigerant plates 42B. The refrigerant is an example of a first heat exchange medium. Between each of the first refrigerant plates 42A and between each of the second refrigerant plates 42B are coolant plates 46. The coolant plates 46 include coolant passageways 48 configured to conduct coolant across the coolant plates 46. The coolant is an example of a second heat exchange medium.

The chiller 40 further includes a first refrigerant inlet 70A, which extends from the first valve outlet 86 to the first refrigerant passageways 44A of the first refrigerant plates 42A. The chiller 40 also includes a second refrigerant inlet 70B, which extends from the second valve outlet 88 to the second refrigerant passageways 44B of the second refrigerant plates 42B. From the first refrigerant passageways 44A and the second refrigerant passageways 44B, refrigerant exits the chiller 40 through a refrigerant outlet 74.

The chiller 40 includes a coolant inlet is 76. The coolant inlet 76 is in fluid communication with the coolant conduit 22 and the coolant passageways 48, which allows coolant to flow into the coolant passageways 48. A coolant outlet 78 is in fluid communication with the coolant passageways 48 and the coolant conduit 22 downstream of the chiller 40. Coolant from the coolant loop 20 thus flows into the chiller 40 through the coolant inlet 76, through the coolant passageways 48, and out of the chiller 40 through the coolant outlet 78.

When the expansion valve 80 is in the fully closed position, the needle 110 restricts refrigerant flow through the first valve outlet 86 and the second valve outlet 88. When the needle 110 is moved to the partially opened first open position in which refrigerant flows through the first valve outlet 86, but not through the second valve outlet 88, refrigerant only flows through the first refrigerant inlet 70A to the first refrigerant passageways 44A of the first refrigerant plates 42A and does not flow through the second refrigerant inlet 70B to the second refrigerant passageways 44B of the second refrigerant plates 42B. This configuration effectively reduces the overall size and surface area of the chiller 40. When the needle 110 is moved to the fully open second opened position in which refrigerant flows through the first valve outlet 86 and the second valve outlet 88, refrigerant flows through both the first and second refrigerant inlets 70A, 70B to both the first and second refrigerant passageways 44A, 44B, which maximizes the surface area of the chiller 40.

The thermal management system 12 further includes a control module 150. The control module 150 is in communication with the motor 130 to operate the motor 130. The control module 150 receives inputs from any suitable temperature sensors and pressure sensors monitoring temperature and pressure of the coolant loop 20 and the refrigerant loop 50. For example, the control module 150 is configured to receive temperature inputs from temperature sensors monitoring temperature of coolant in the coolant loop 20 and the temperature of refrigerant in the refrigerant loop 50. The control module 150 may also receive inputs from any suitable pressure sensors of the system 12 configured to identify pressure of coolant within the coolant loop 20 and the refrigerant in the refrigerant loop 50. With respect to the refrigerant loop, pressure sensors monitor pressure of refrigerant flowing into and out of the expansion valve 80. The control module 150 is configured to operate the motor 130 of the expansion valve 80 based on inputs from the temperature sensors and/or the pressure sensors.

For example, under relatively low load conditions, such as when the vehicle 10 is traveling at low speeds under relatively cool ambient conditions, the control module 150 operates the motor 130 to actuate the needle 110 such that the first valve outlet 86 only slightly opens, and the second valve outlet 88 remains closed. As a result, refrigerant will flow through the first passageway 120, but not through the second passageway 122. From the first passageway 120, refrigerant will flow through the first refrigerant inlet 70A to the first refrigerant passageways 44A of the first refrigerant plates 42A. Because the second valve outlet 88 is closed, refrigerant will not flow to the second refrigerant inlet 70B, and will not flow through the second refrigerant passageways 44B of the second refrigerant plates 42B. As a result, the overall effective size of the chiller 40 is reduced as compared to if refrigerant was also flowing through the second refrigerant passageways 44B. Reducing the overall effective size of the chiller 40 advantageously lowers superheat into the compressor 60, which allows oil present in the refrigerant to be usable by the compressor 60. If there is a healthy oil circulation rate (OCR) through the refrigerant conduits 52, lowering the super heat will allow the oil to be beneficial to the compressor 60. Increasing refrigerant mass flow increases OCR to the compressor 60 (which is what happens when only the first refrigerant passageways 44A, and not the second refrigerant passageways 44B, of the chiller 40 are used under low loads). Healthy OCR protects the compressor 60 from potential damage, which in turn keeps the compressor 60 from overheating. The oil provides a lubrication layer between a fixed and orbiting scroll within the compressor 60.

Under relatively high load conditions, such as when the vehicle 10 is being aggressively driven or the vehicle battery 30 is undergoing rapid charging, the control module 150 will detect an increase in coolant temperature within the coolant loop 20 by way of the temperature sensors. In response, the control module 150 is configured to operate the motor 130 to actuate the needle 110 such that refrigerant flows out of the expansion valve 80 through both the first valve outlet 86 and the second valve outlet 88. As a result, refrigerant flows to the chiller through both the first refrigerant inlet 70A and the second refrigerant inlet 70B, and through both the first refrigerant passageways 44A of the first refrigerant plates 42A and the second refrigerant passageways 44B of the second refrigerant plates 42B. Because refrigerant flows across both the first and second refrigerant plates 42A, 42B, the effective size of the chiller 40 is increased as compared to the partially open configuration of the expansion valve 80 when refrigerant only flows out of the first valve outlet 86. The heat transfer capability of the chiller 40 is also increased. For example, if the chiller 40 has a 10 kw capacity overall, partially opening the expansion valve 80 so refrigerant only flows out of the first valve outlet 86 to only the first refrigerant plates 42A will result in the chiller 40 operating at less than 10 kw, such as 3 kw for example. Thus, the heat exchange capacity of the chiller 40 can be customized based on the cooling needs of the coolant loop 20 without reducing system performance and without adding additional hardware. The system 12 increases coolant to refrigerant surface area in multiple stages in order to match refrigerant mass flow from the expansion valve 80 with coolant mass flow from the coolant pump 24. Disengaging unnecessary second refrigerant plates 42B under low load conditions enables higher refrigerant velocity through the first refrigerant plates 42A, which increases OCR.

The chiller 40 may be configured such that the relative number of first refrigerant plates 42A versus the second refrigerant plates 42B is at any suitable ratio. For example, the first refrigerant plates 42A may consist of three plates, and the second refrigerant plates 42B may consist of five plates. However, any suitable number of first refrigerant plates 42A and second refrigerant plates 42B may be included. And the number of first refrigerant plates 42A may be less than or greater than the number of second refrigerant plates 42B.

Figures 5, 6A, 6B:
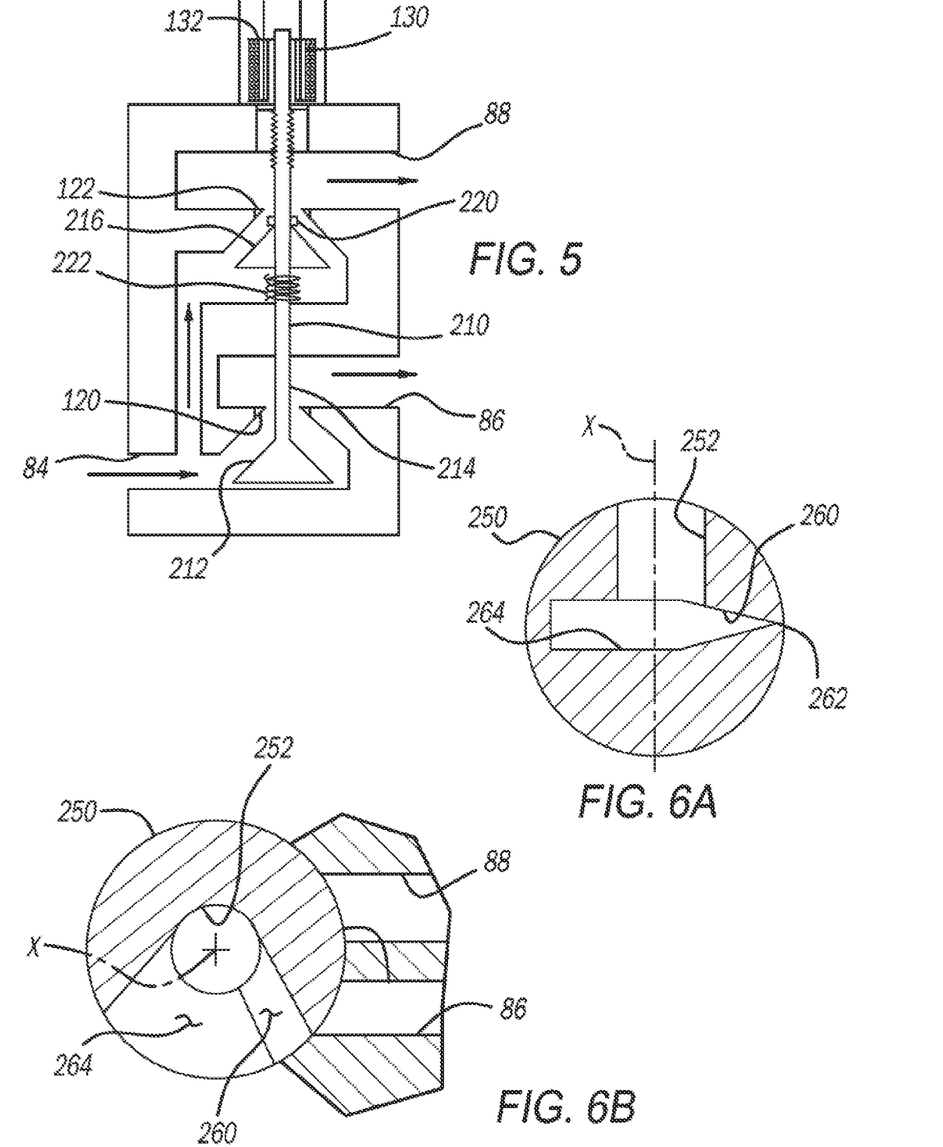
FIG. 5 illustrates an additional exemplary configuration of the expansion valve.
FIG. 6A is a side view of an exemplary rotary ball actuator of another expansion valve in accordance with the present disclosure.
FIG. 6B is a top view of the rotary ball actuator in a closed position.

The needle 110 of FIG. 3 is only one exemplary actuator for the expansion valve 80. FIG. 5 illustrates an additional exemplary actuation needle 210. The needle 210 is similar to the needle 110, but is moved vertically in an opposite direction relative to the orientations illustrated. The needle 210 includes a first member 212 at the end of a rod 214. The rod 214 extends through a second member 216. The first member 212 is configured to sit in the first passageway 120, and the second member 216 is configured to sit in the second passageway 122. The rod 214 includes a tab 220 above the second member 216. In the fully closed position, the first member 212 is seated in the first passageway 120 and the second member 216 is seated in the second passageway 122 to close the first and second passageways 120, 122. In the partially opened first open position, the motor 130 rotates in a first direction to move the shaft downward such that the first member 212 moves out of the first passageway 120 to allow refrigerant to flow through the first passageway 120. The second member 216 is held within the second passageway 122 by a spring 222. The spring 222 allows both passageways 120, 122 to have a positive seal using standard machining tolerances. As the motor 130 moves the rod 214 further, the tab 220 moves downward into cooperation with the second member 216 to move the second member 216 downward and open the second passageway 122.

Figure 6C:
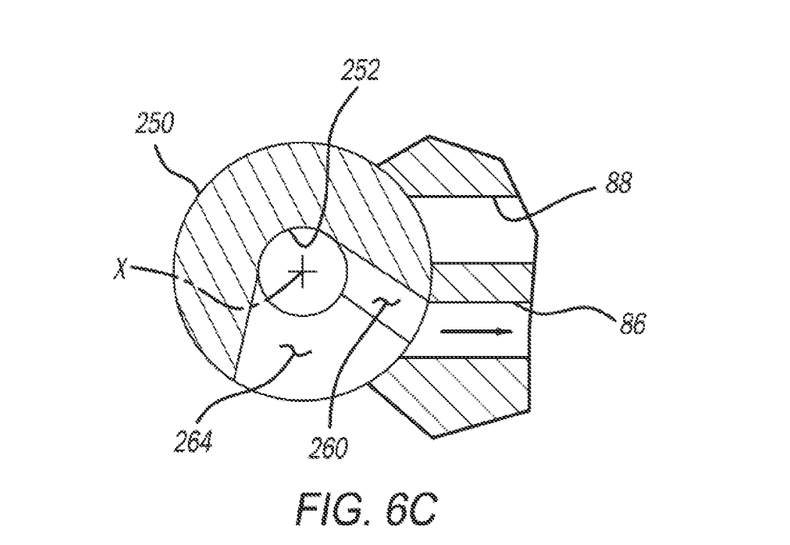
FIG. 6C is a top view of the rotary ball actuator in a partially open position.
Figure 6D:
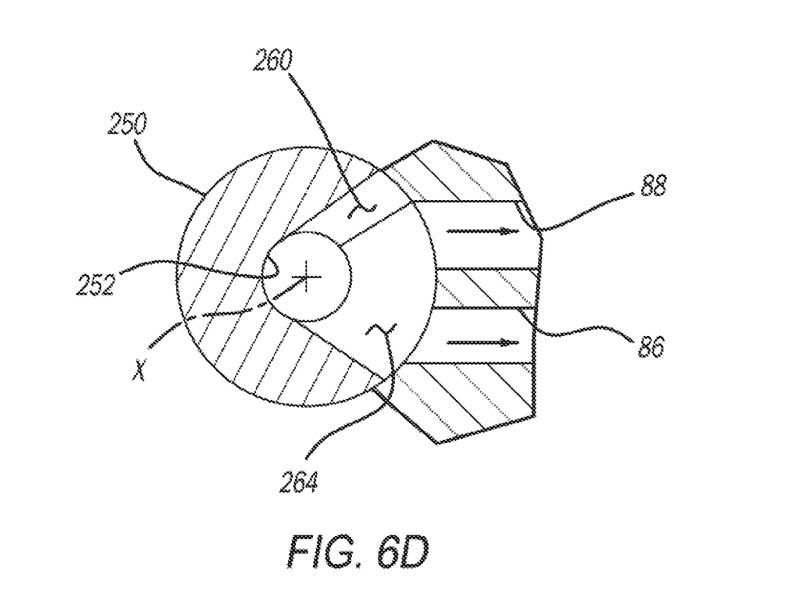
FIG. 6D is a top view of the rotary ball actuator in a fully open position.

FIGS. 6A-6D illustrate another exemplary actuator for the expansion valve 80 in the form of a rotary ball actuator 250, which is configured to rotate about axis X. With particular reference to FIG. 6A, the ball actuator 250 defines an inlet 252, a partial flow portion 260 with a tapered end 262, and a full flow portion 264. As illustrated in FIG. 6B, the ball actuator 250 is rotatable to a fully closed position in which the partial and full flow portions 260, 264 are not aligned with the first and second valve outlets 86, 88 so as to prevent refrigerant from flowing from the inlet 252 to the valve outlets 86, 88. The ball actuator 250 is rotatable counter-clockwise in the orientation illustrated to a first open position in FIG. 6C, in which the partial flow portion 260 is aligned with the first valve outlet 86 to allow refrigerant to flow from the inlet 252 to the first valve outlet 86, but not to the second valve outlet 88. Because the partial flow portion 260 is tapered, the amount of refrigerant that will flow through the first valve outlet 86 progressively increases as the rotary ball actuator 250 rotates to align the wider portion of the partial flow portion 260 with the first valve outlet 86. FIG. 6D illustrates the ball actuator 250 rotated further counter-clockwise in the orientation illustrated to a second open position, which is a fully opened position. In the second open position, the full flow portion 264 is aligned with both the first and second valve outlets 86, 88 to allow maximum flow therethrough. The ball actuator 250 is also rotatable to any suitable intermediate position between the positions of FIGS. 6C and 6D. For example, the partial flow portion 260 may be aligned with the second valve outlet 88 and the full flow portion 264 may be aligned with the first valve outlet 86, which will result in full flow through the first valve outlet 86 and partial flow through the second valve outlet 88.

The system 12 further includes an expansion valve 80' controlling refrigerant flow into the evaporator 66. The expansion valve 80' and the evaporator 66 may be configured similar to the expansion valve 80 and the chiller 40 respectively. For example, the expansion valve 80' may have a single inlet and two or more outlets. Each of the outlets of the expansion valve 80' is in fluid communication with a different group of tubes and fins of the evaporator 66. Thus, actuation of the expansion valve 80' to allow refrigerant flow through only the first outlet results in refrigerant flow across only a first group of tubes and fins of the evaporator 66. Actuation of the expansion valve 80' to allow refrigerant flow through both the first outlet and the second outlet results in refrigerant flow across both the first group and a second group of tubes and fins of the evaporator 66 to increase the heat transfer capacity of the evaporator 66. The evaporator 66 does not include coolant channels, but instead exchanges heat with air circulating over the evaporator 66.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A thermal management system comprising:
 a heat exchanger including:
  a first inlet in fluid communication with first passageways configured to conduct a first heat exchange medium therethrough;
  a second inlet in fluid communication with second passageways configured to conduct the first heat exchange medium therethrough; and
  a first outlet in fluid communication with the first passageways and the second passageways, the first passageways and the second passageways merge at a merger area defined by the heat exchanger upstream of the first outlet relative to flow of the first heat exchange medium through the heat exchanger,
  wherein the first passageways are fluidically isolated from the second passageways from the first inlet to the merger area, and the second passageways are fluidically isolated from the first passageways from the second inlet to the merger area;
 an expansion valve in fluid communication with the heat exchanger to control the flow of the first heat exchange medium to the heat exchanger, the expansion valve including:
  a valve inlet;
  a first valve outlet in fluid communication with the first inlet and the first passageways of the heat exchanger;
  a second valve outlet in fluid communication with the second inlet and the second passageways of the heat exchanger; and
  an actuator movable from a closed position to a first open position and a second open position;

wherein:
  in the closed position the actuator restricts the flow of the first heat exchange medium through the first valve outlet and the second valve outlet;
  in the first open position the actuator permits the flow of the first heat exchange medium through the first valve outlet to the first passageways and restricts the flow of the first heat exchange medium through the second valve outlet to the second passageways; and
  in the second open position the actuator permits the flow of the first heat exchange medium through the first valve outlet to the first passageways and permits the flow of the first heat exchange medium through the second valve outlet to the second passageways.

2. The thermal management system of claim 1, wherein the heat exchanger is a chiller.

3. The thermal management system of claim 1, wherein the expansion valve is an electronic expansion valve, and the actuator is movable by a motor to each of the closed position, the first open position, and the second open position.

4. The thermal management system of claim 1, wherein the heat exchanger is an evaporator.

5. The thermal management system of claim 2, wherein the first heat exchange medium is a refrigerant.

6. The thermal management system of claim 5, wherein the heat exchanger further includes third passageways adjacent to the first passageways and the second passageways, the third passageways configured to conduct a second heat exchange medium therethrough.

7. The thermal management system of claim 6, wherein the second heat exchange medium is a coolant.

8. The thermal management system of claim 7, wherein the chiller is in fluid communication with a refrigerant loop and a coolant loop including a vehicle battery.

9. The thermal management system of claim 8, further comprising a controller configured to control movement of the actuator;
 wherein the controller is configured to move the actuator from the closed position to the first open position when temperature of the coolant in the coolant loop reaches a first level; and
 wherein the controller is configured to move the actuator from the first open position to the second open position when temperature of the coolant in the coolant loop reaches a second level that is greater than the first level.

10. The thermal management system of claim 3, wherein the actuator is a needle actuator.

11. The thermal management system of claim 3, wherein the actuator is a rotary actuator.

12. A thermal management system comprising:
 a chiller including:
  a first inlet in fluid communication with first refrigerant passageways configured to conduct refrigerant therethrough;
  a second inlet in fluid communication with second refrigerant passageways configured to conduct the refrigerant therethrough;
  a first outlet in fluid communication with the first refrigerant passageways and the second refrigerant passageways, the first refrigerant passageways and the second refrigerant passageways merge at a merger area defined by the chiller upstream of the first outlet relative to flow of the refrigerant through the chiller; and
  coolant passageways adjacent to the first refrigerant passageways and the second refrigerant passageways, the coolant passageways configured to conduct coolant therethrough,
wherein the first refrigerant passageways are fluidically isolated from the second refrigerant passageways from the first inlet to the merger area, and the second refrigerant passageways are fluidically isolated from the first refrigerant passageways from the second inlet to the merger area;
an expansion valve in fluid communication with the chiller to control the flow of the refrigerant to the chiller, the expansion valve including:
a valve inlet;
a first valve outlet in fluid communication with the first inlet of the chiller and the first refrigerant passageways;
a second valve outlet in fluid communication with the second inlet of the chiller and the second refrigerant passageways; and
an actuator movable from a closed position to a first open position and a second open position, the actuator including a single actuating element configured to control the flow of the refrigerant through both the first valve outlet and the second valve outlet;
wherein:
in the closed position, the actuator restricts the flow of the refrigerant through the first valve outlet and the second valve outlet;
in the first open position, the actuator permits the flow of the refrigerant through the first valve outlet to the first refrigerant passageways and restricts the flow of the refrigerant through the second valve outlet to the second refrigerant passageways; and
in the second open position, the actuator permits the flow of the refrigerant through the first valve outlet to the first refrigerant passageways and permits the flow of the refrigerant through the second valve outlet to the second refrigerant passageways.

13. The thermal management system of claim 12, wherein the chiller is in fluid communication with a refrigerant loop and a coolant loop including a vehicle battery.

14. The thermal management system of claim 12, wherein the actuator is a needle actuator.

15. The thermal management system of claim 12, wherein the actuator is a rotary actuator.

16. The thermal management system of claim 13, further comprising a controller configured to control movement of the actuator;
wherein the controller is configured to move the actuator from the closed position to the first open position when temperature of coolant in the coolant loop reaches a first level; and
wherein the controller is configured to move the actuator from the first open position to the second open position when the temperature of the coolant in the coolant loop reaches a second level that is greater than the first level.

17. The thermal management system of claim 16, wherein the expansion valve is an electronic expansion valve, and the actuator is movable by a motor of the electronic expansion valve to each of the closed position, the first open position, and the second open position.

18. A thermal management system comprising:
a coolant loop including a coolant pump, a vehicle battery configured to power a vehicle motor, and a chiller including a first chiller inlet in fluid communication with first refrigerant passageways defined in the chiller and a second chiller inlet in fluid communication with second refrigerant passageways defined in the chiller, the first refrigerant passageways and the second refrigerant passageways merge at a merger area defined by the chiller upstream of a chiller outlet in fluid communication with the first refrigerant passageways and the second refrigerant passageways, the first refrigerant passageways are fluidically isolated from the second refrigerant passageways from the first chiller inlet to the merger area, and the second refrigerant passageways are fluidically isolated from the first refrigerant passageways from the second chiller inlet to the merger area;
a refrigerant loop including the chiller, a compressor, and an expansion valve configured to control flow of refrigerant to the chiller, the expansion valve including a valve inlet, a first valve outlet in fluid communication with the first chiller inlet, a second valve outlet in fluid communication the second chiller inlet, an actuator including a single actuating element configured to control the refrigerant flow through both the first valve outlet and the second valve outlet, and a motor configured to move the actuator; and
a controller control module configured to control movement of the actuator of the expansion valve;
wherein:
the controller control module is configured to control the motor of the expansion valve to move the actuator from a closed position to a first open position when temperature of the coolant in the coolant loop reaches a first level, in the first open position the actuator permits the refrigerant flow through the first valve outlet to the first refrigerant passageways of the chiller and restricts the refrigerant flow through the second valve outlet to the second refrigerant passageways; and
the controller control module is configured to move the actuator from the first open position to a second open position when temperature of the coolant in the coolant loop reaches a second level that is greater than the first level, in the second open position the actuator permits the refrigerant flow through the first valve outlet to the first refrigerant passageways of the chiller and permits the refrigerant flow through the second valve outlet to the second refrigerant passageways.

19. The thermal management system of claim 18, wherein the chiller further defines coolant passageways between each of the first refrigerant passageways and the second refrigerant passageways, the coolant passageways in fluid communication with the coolant loop.

20. The thermal management system of claim 18, wherein the refrigerant loop further includes a cabin condenser and an evaporator.

* * * * *